US009584763B2

(12) United States Patent
Tangeland et al.

(10) Patent No.: US 9,584,763 B2
(45) Date of Patent: Feb. 28, 2017

(54) AUTOMATIC SWITCHING BETWEEN DYNAMIC AND PRESET CAMERA VIEWS IN A VIDEO CONFERENCE ENDPOINT

(71) Applicant: Cisco Technology, Inc., San Jose, CA (US)

(72) Inventors: Kristian Tangeland, Oslo (NO); Rune Oistein Aas, Eidsvoll (NO); Erik Hellerud, Oslo (NO)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/534,557

(22) Filed: Nov. 6, 2014

(65) Prior Publication Data

US 2016/0134838 A1    May 12, 2016

(51) Int. Cl.
*H04M 1/24* (2006.01)
*H04N 7/15* (2006.01)
*H04N 5/232* (2006.01)
*H04N 7/14* (2006.01)

(52) U.S. Cl.
CPC ......... *H04N 7/152* (2013.01); *H04N 5/23219* (2013.01); *H04N 7/147* (2013.01); *H04N 7/142* (2013.01)

(58) Field of Classification Search
USPC ........... 348/14.01, 14.08, 14.09, 14.1, 14.11, 348/14.16, 211.12, 39, 208.16, 211.9, 348/333.11
See application file for complete search history.

(56) References Cited

U.S. PATENT DOCUMENTS

| 5,959,667 | A | * | 9/1999 | Maeng | H04N 7/15 348/14.08 |
|---|---|---|---|---|---|
| 8,169,463 | B2 | | 5/2012 | Enstad et al. | |
| 2013/0335508 | A1 | | 12/2013 | Mauchly | |

OTHER PUBLICATIONS

Scola, et al., "Direction of arrival estimation—A two microphones approach," Master Thesis, Blekinge Institute of Technology, Sep. 2010, 86 pages.

* cited by examiner

*Primary Examiner* — Yosef K Laekemariam
(74) *Attorney, Agent, or Firm* — Edell, Shapiro & Finnan, LLC

(57) ABSTRACT

A video conference endpoint includes one or more cameras to capture video of different views and a microphone array to sense audio. One or more preset views are defined. The endpoint detects faces in the captured video and active audio sources from the sensed audio. The endpoint detects any active talker detected faces that coincide positionally with detected active audio sources, and also detects whether any active talker is in one of the preset views. Based on whether an active talker is detected in any of the preset views, the endpoint switches between capturing video of one of the preset views, and capturing video of a dynamic view.

18 Claims, 8 Drawing Sheets

AUTOMATIC SWITCHING BETWEEN DYNAMIC AND PRESET CAMERA VIEWS IN A VIDEO CONFERENCE ENDPOINT

TECHNICAL FIELD

The present disclosure relates to automatic switching between camera views in a video conference system.

BACKGROUND

A video conference system includes an endpoint that captures video of participants in a room during a conference, for example, and then transmits the video to a conference server or to a "far-end" endpoint. During the conference, the participants may wish to show specific objects of interest to participants at the far-end, such as when one of the participants moves to a whiteboard to explain and/or draw illustrations on the whiteboard. A camera in the endpoint may frame the entire room, thus rendering the object of interest, e.g. the whiteboard, too small to be read. Alternatively, the camera may point away from the object of interest and, therefore, fail to capture it. As a result, the participants may be forced to manually control pan, tilt, and/or zoom settings of the camera so that the camera points to and captures the object of interest in sufficient viewable detail; however, such manipulation of the camera is time consuming, cumbersome, and intrusive to the participants.

DESCRIPTION OF EXAMPLE EMBODIMENTS

Overview

Techniques presented herein automate switching between dynamic and preset camera views in a video conference endpoint. The endpoint includes one or more cameras controllable to capture video of different views and a microphone array to sense audio. The endpoint defines one or more preset views from which to capture video. The endpoint detects faces and associated positions thereof in the captured video, and detects active audio sources and associated positions thereof from the sensed audio. The endpoint detects any active talkers each as a detected face that coincides positionally with a detected audio source, and detects whether an active talker is in any of the preset views. Based on results of whether an active talker is detected in any of the preset views, the endpoint automatically switches between (i) capturing video of one of the preset views, and (ii) capturing video of a dynamic view and dynamically adjusting the dynamic view to track changing detected face positions.

Example Embodiments

Figure 1:
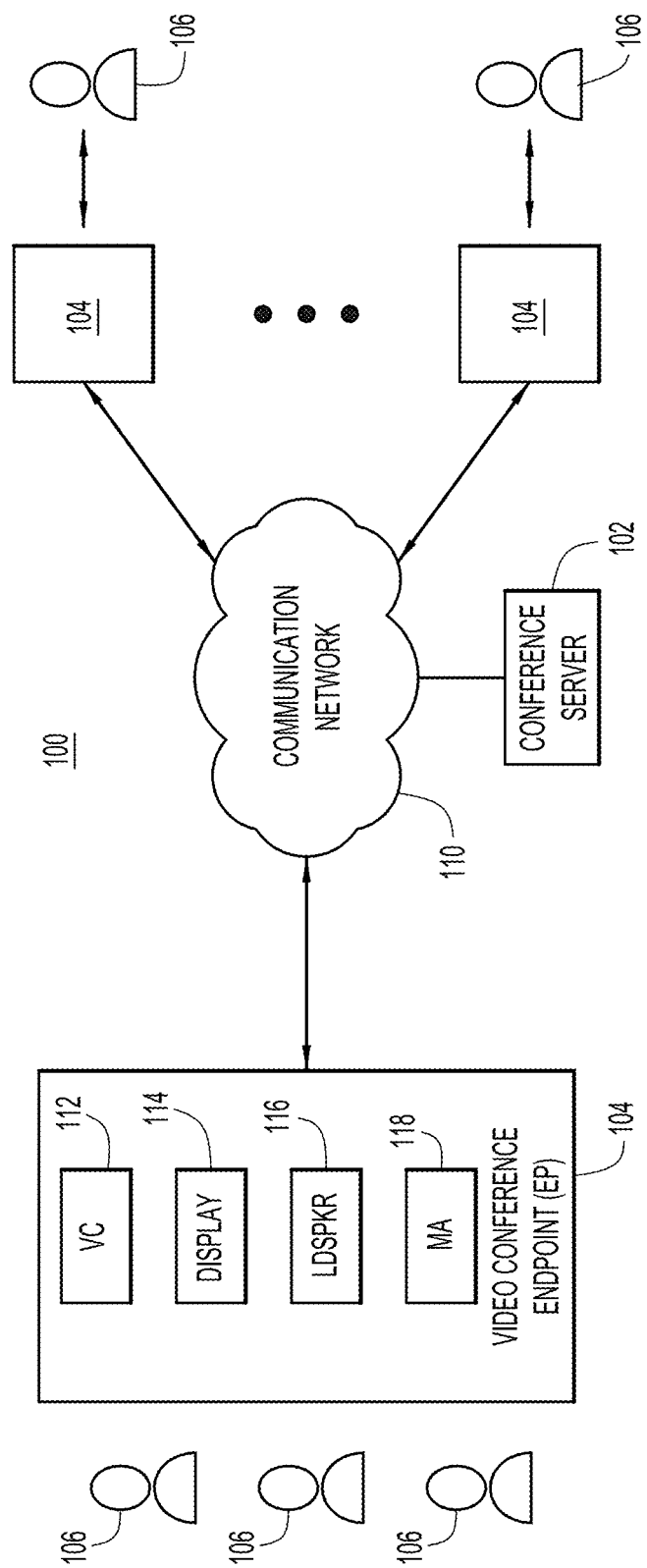
FIG. 1 is a block diagram of a video conference (e.g., teleconference) environment in which a video conference endpoint automates switching between dynamic and preset camera views during a video conference, according to an example embodiment.

With reference to FIG. 1, there is depicted a block diagram of a video conference (e.g., teleconference) environment 100 in which a video conference endpoint automates switching between dynamic and preset camera views to capture actively talking participants. Video conference environment 100 includes video conference endpoints 104 operated by local users/participants 106 and configured to establish audio-visual teleconference collaboration sessions with each other over a communication network 110. Communication network 110 may include one or more wide area networks (WANs), such as the Internet, and one or more local area networks (LANs). A conference server 102 may also be deployed to coordinate the routing of audio-video streams among the video conference endpoints.

Each video conference endpoint 104 may include one or more video cameras (VC) 112, a video display 114, a loudspeaker (LDSPKR) 116, and a microphone array (MA) 118. Endpoints 104 may be wired or wireless communication devices equipped with the aforementioned components, such as, but not limited to laptop and tablet computers, smartphones, etc. In a transmit direction, endpoints 104 capture audio/video from their local participants 106 with MA 118/VC 112, encode the captured audio/video into data packets, and transmit the data packets to other endpoints or to the conference server 102. In a receive direction, endpoints 104 decode audio/video from data packets received from the conference server 102 or other endpoints and present the audio/video to their local participants 106 via loudspeaker 116/display 114.

Figure 2:
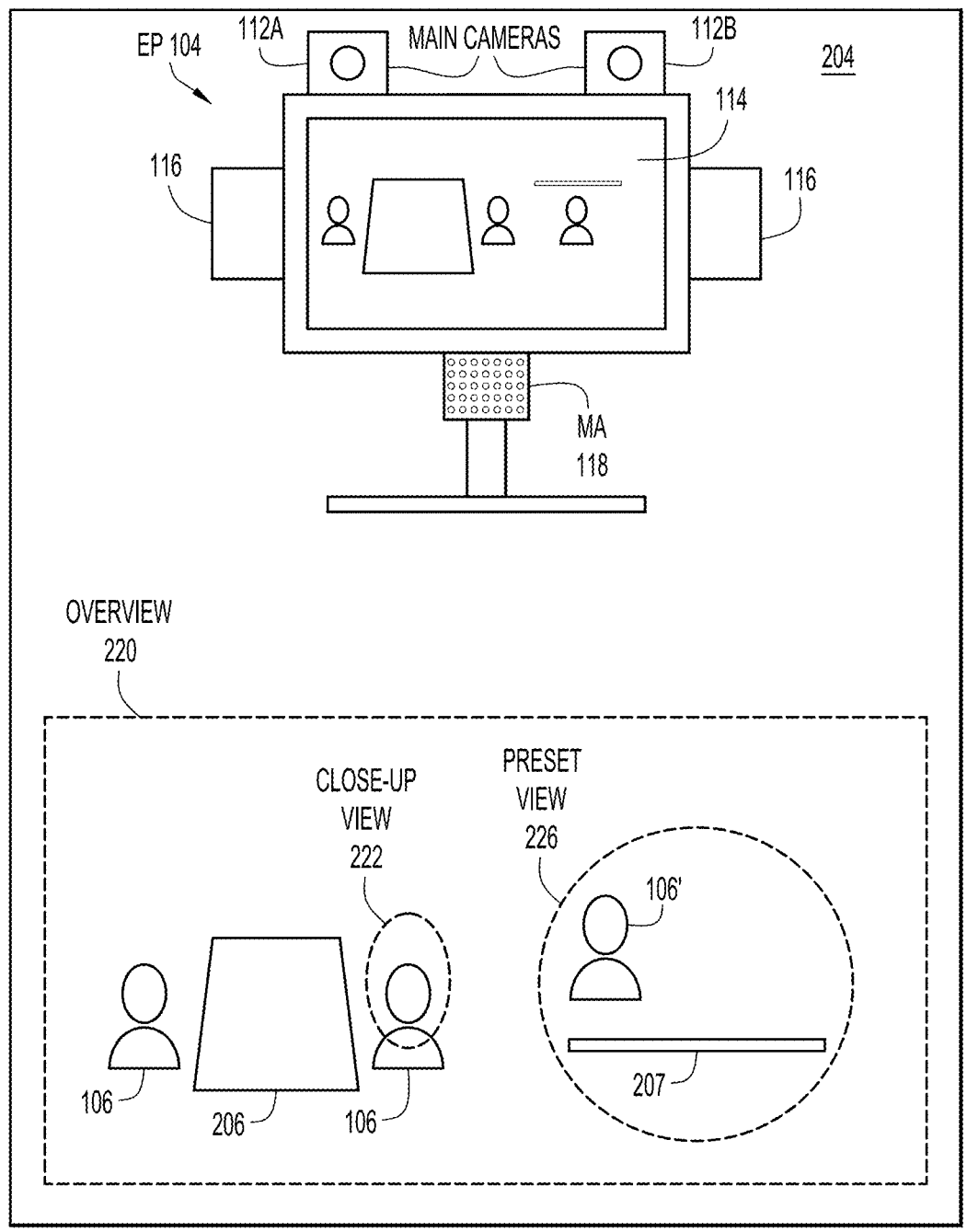
FIG. 2 is an illustration of video conference endpoint deployed in a conference room, according to an example embodiment.

Referring now to FIG. 2, there is depicted an illustration of video conference endpoint 104 deployed in a conference room 204 (depicted simplistically as an outline in FIG. 2), according to an embodiment. Video conference endpoint 104 includes main or center video cameras 112A and 112B positioned proximate and centered on display 114. Each of cameras 112 typically includes pan, tilt, and zoom (PTZ) features that may be implemented mechanically and/or digitally. Endpoint 104 controls the pan, tilt, and zoom features of each of the cameras 112A and 112B (collectively referred to as "cameras 112") to capture video of different views/scenes of multiple participants 106 seated around a table 206 opposite from or facing (i.e., in front of) the cameras (and display 114), and a participant 106' positioned in front of an object 207, such as a whiteboard. The combination of two video cameras depicted in FIG. 2 is only one example of many possible camera combinations that may be used, as would be appreciated by one of ordinary skill in the relevant arts having read the present description. As depicted in the example of FIG. 2, MA 118 is positioned adjacent to, and centered along, a bottom side of display 114 (i.e., below the display) so as to receive audio from participants 106' and 106 in room 204.

Accordance to techniques presented herein, video conference endpoint 104 processes (i) video captured with cameras 112 to detect and track participant faces and associated positions thereof, and (ii) audio sensed by MA 118 to detect active audio sources, i.e., active talkers among the participants, and associated positions thereof. Based on comparisons between the detected/tracked participant faces and the detected active talkers, video conference endpoint 104 automatically controls cameras 112 to capture video of different views of participants 106 and 106'; more specifically, the endpoint controls cameras 112 to switch between different views in which video is captured.

The different views include dynamic views and preset views. The dynamic views include a dynamic overview or wide-angle view to capture video of all detected participant faces and a dynamic close-up view to capture video focused on one active talker among the participants, for example. Endpoint 104 creates dynamic views, without user input to define the views initially, and controls cameras 112 to dynamically adjust the dynamic views when created/operable as participants 106 and 106' shift positions within, leave, and/or enter the dynamic view (e.g., the endpoint adjusts camera zoom, pan, and/or tilt associated with the dynamic view). On the other hand, preset views are initially defined by the user as preset camera positions. When operable, a given preset view is based primarily on the initial preset camera position, but may be adjusted slightly under dynamic control from endpoint 104, e.g., the preset view may be expanded slightly to include an object near the initial preset view. Examples of such different views are depicted in FIG. 2 as a dynamic overview 220 encompassing all of participants 106 and 106', a dynamic close-up view 222 focused on the middle participant, and a preset view 226 focused on participant 106'.

Figure 3:
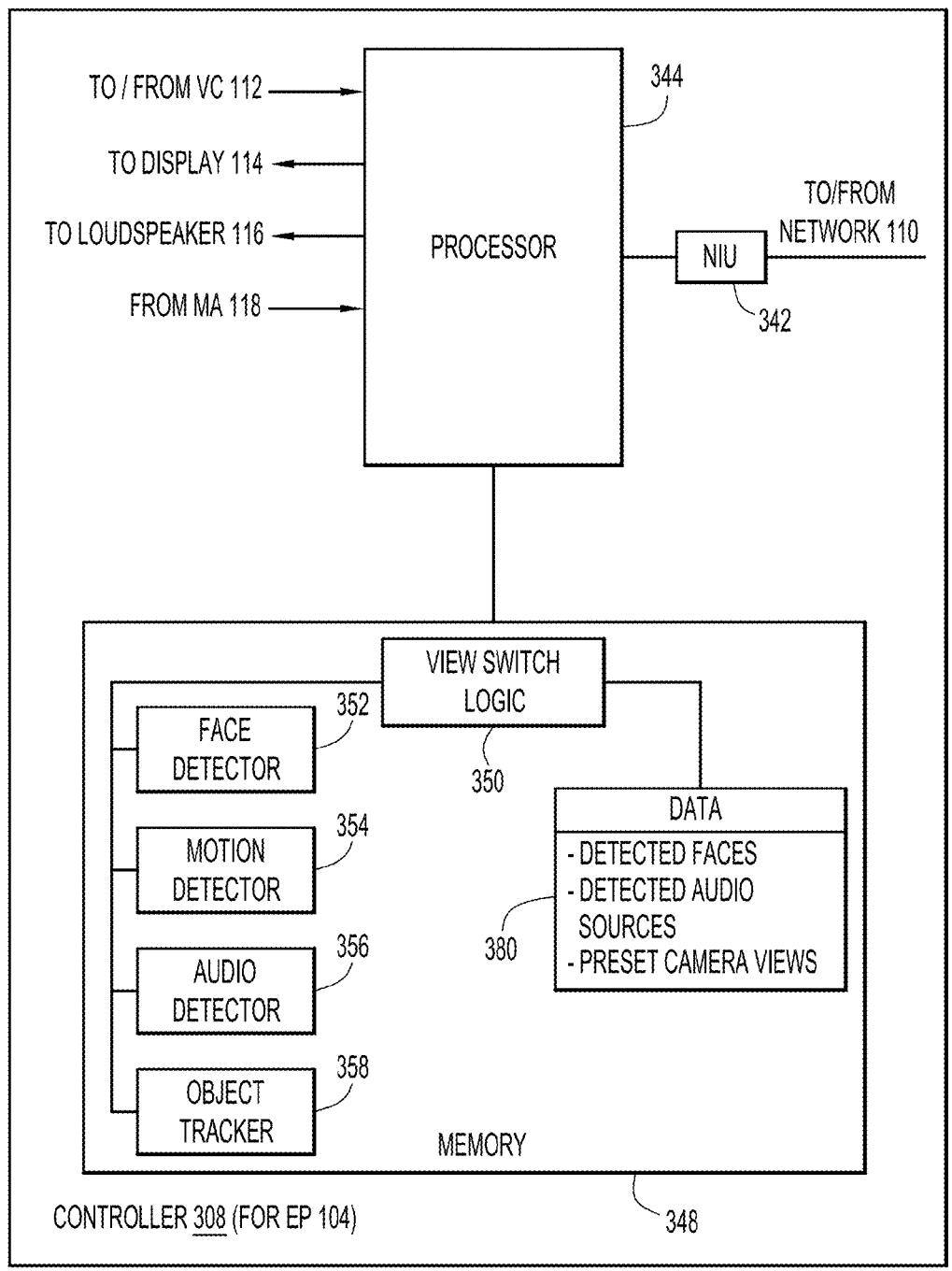
FIG. 3 is block diagram of a controller of the video conference endpoint, according to an example embodiment.

Reference is now made to FIG. 3, which shows an example block diagram of a controller 308 of video conference endpoint 104 configured to perform automated switching between dynamic and preset camera views to capture active talkers during a video conference. There are numerous possible configurations for controller 308 and FIG. 3 is meant to be an example. Controller 308 includes a network interface unit 342, a processor 344, and memory 348. The network interface (I/F) unit (NIU) 342 is, for example, an Ethernet card or other interface device that allows the controller 308 to communicate over communication network 110. Network I/F unit 342 may include wired and/or wireless connection capability.

Processor 344 may include a collection of microcontrollers and/or microprocessors, for example, each configured to execute respective software instructions stored in the memory 348. The collection of microcontrollers may include, for example: a video controller to receive, send, and process video signals related to display 112 and video cameras 112; an audio processor to receive, send, and process audio signals related to loudspeaker 116 and MA 118; and a high-level controller to provide overall control. Processor 344 may send pan, tilt, and zoom commands to video camera 112, which is responsive to the commands as would be appreciated by one of ordinary skill in the relevant arts. Portions of memory 348 (and the instruction therein) may be integrated with processor 344. In the transmit direction, processor 344 encodes audio/video captured by MA 118/VC 112, encodes the captured audio/video into data packets, and causes the encoded data packets to be transmitted to communication network 110. In a receive direction, processor 344 decodes audio/video from data packets received from communication network 110 and causes the audio/video to be presented to local participants 106 via loudspeaker 116/display 114. As used herein, the terms "audio" and "sound" are synonymous and interchangeably.

The memory 348 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, the memory 348 may comprise one or more computer readable storage media (e.g., a memory device) encoded with software comprising computer executable instructions and when the software is executed (by the processor 344) it is operable to perform the operations described herein. For example, the memory 348 stores or is encoded with instructions for View Switch logic 350 to perform operations described herein for switching between different views. View Switch logic 350 also includes a Face Detector 352 to detect faces based on captured video, a Motion Detector 354 to detect motion based on captured video, an Audio Detector 356 to detect active audio sources and classify the detected audio as voice/speech based on sensed/transduced audio, and an Object Tracker 358 to track objects in captured video.

In addition, memory 348 stores data 380 used and generated by logic/detectors 350-358, including, but not limited to: face/motion information used and generated by logic/detectors 350, 352, and 354, including information associated with detected faces (e.g., positions, confidence levels, stored detected faces, and the like), and information associated with detected motion (e.g., positions of the motion within video frames); audio source information used and generated by logic 350 and detector 356 including information associated with detected active audio sources (e.g., positions); and information defining preset camera views (e.g., positions).

In other embodiments, portions of controller 308 may be distributed. For example, portions of Face and Motion Detectors 352, 354 and an associated processor may be incorporated or co-located with video cameras 112, in which case the distributed Detectors and associated processor transmit detected face and motion information to controller 308 for use in higher level processing at controller 308.

Figure 4:
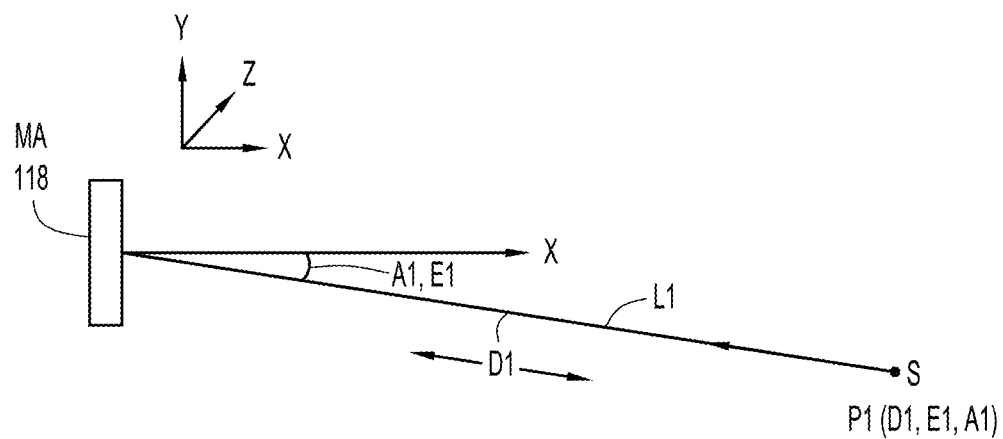
FIG. 4 is an illustration of an active audio source spaced apart from a microphone array of the video conference endpoint, according to an example embodiment.

With reference to FIG. 4, there is depicted a side-view of an example active audio source S spaced apart from MA 118. The audio source may represent an active talker among participants 106 and 106'. Audio source S is separated or spaced from MA 118 by a distance D1 along a directional axis line L1. Audio source A subtends an elevation angle E1 relative to an x-z plane (i.e., the plane encompassing both the x axis and the z axis) and an azimuth angle A1 relative to an x-y plane (i.e., the plane encompassing both the x axis and the y axis). Distance D1, elevation angle E1, and azimuth angle A1 collectively define a 3-Dimensional (3-D) position P1 of audio source S relative to MA 118. MA 118 receives audio/sound from audio source A, senses/transduces the audio, and provides the sensed audio to controller 308. Controller 308 performs audio signal processing on the sensed audio, particularly from different spaced-apart pairs of microphones of MA 118, to derive a sound angle of arrival at MA 118 of the audio originating from audio source S. In an embodiment in which MA 118 is a planar 2-D MA, the derived sound angle of arrival encompasses elevation angle E1 and azimuth angle A1, and range D1.

In one example, the sound angle of arrival may be derived based on a time difference $\Delta t$ between time-of-arrivals (TOAs) of sound received at (and sensed/transduced by) the individual microphones. The sound angle of arrival may be determined based on the following formula: sound angle of arrival=arcsin($\Delta t \ast c/d$), where: $\Delta t$=the TOA time difference; d=the individual microphone spacing; and c=the speed of sound in air at a given air temperature T. Additionally, controller 308 also derives distance D1 between MA 118 and audio source S based on a combination of multiple time differences $\Delta t$ derived from the sensed audio from the different microphone pairs. Thus, controller 308 derives an estimate of the 3-D position P1 of audio source S (e.g., an active talker) as estimates of the parameters: distance D1; elevation angle E1, and azimuth angle A2. In another example, the angle and range of incoming audio can be calculated by finding the sample delay between microphone pairs. The sample delay for one pair corresponds to a limited number of positions in space. By combining the results from multiple pairs the result will be refined down to a single possible position.

Figure 5:
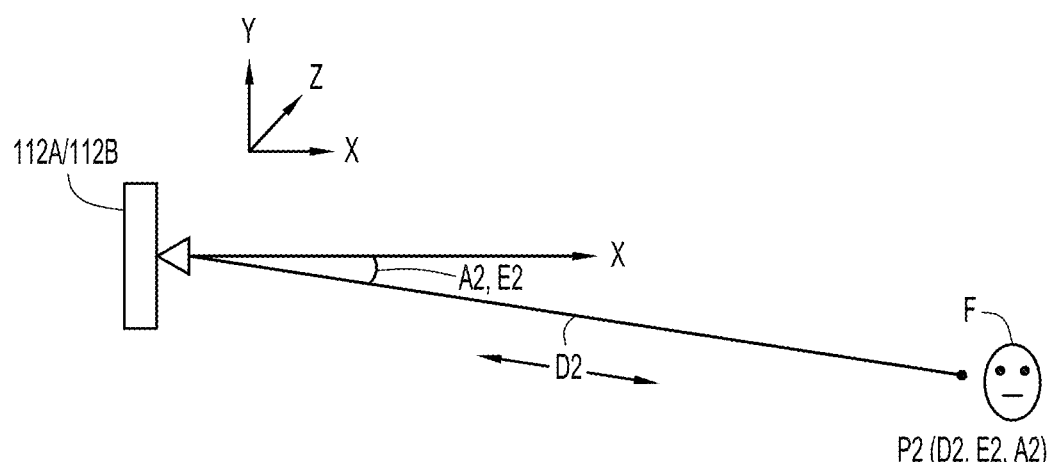
FIG. 5 is an illustration of a face of a participant spaced apart from video cameras of the video conference endpoint, according to an example embodiment.

With reference to FIG. 5, there is depicted a side-view of an example face F of a participant spaced apart from video cameras 112, which may or may not coincide with position SP of audio source S. Participant face F is separated or spaced from video cameras 112 by a distance D2. Participant face F subtends an elevation angle E2 relative to an x-z plane and an azimuth angle A2 relative to an x-y plane. Distance D2, elevation angle E2, and azimuth angle A2 collectively define a 3-Dimensional (3-D) position P2 of participant face F relative to video cameras 112. Controller 308 receives video captured by one or both of cameras 112. Controller 308 performs image processing on the captured video to detect face F and its associated 3-D position P2 as estimates of parameters: distance D2; elevation E2; and azimuth angle A2.

Figure 6A:
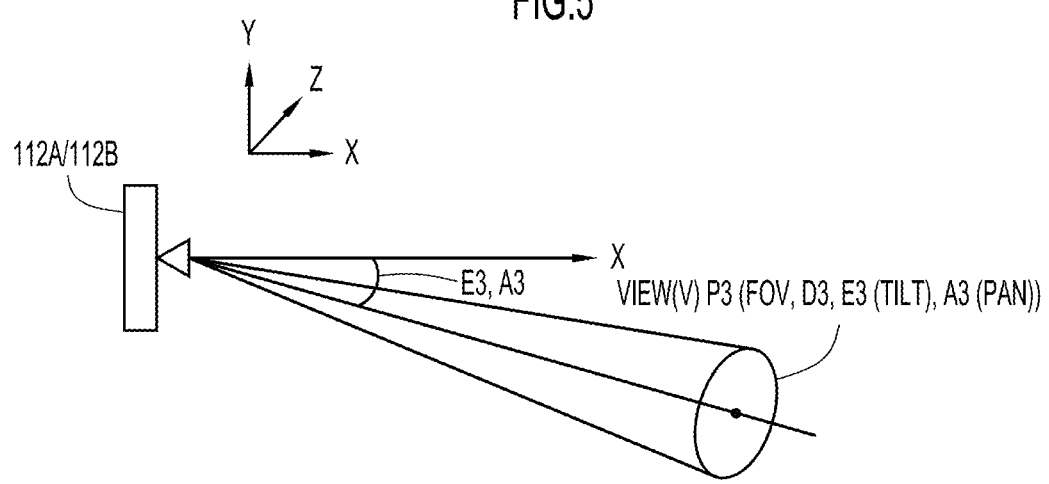
FIG. 6A is an illustration of a camera view for one of the cameras of the video conference endpoint, according to an example embodiment.

With reference to FIG. 6A, there is depicted an example camera view V for one of cameras 112 set by controller 308 to capture video within the view. Camera view V may represent any of a dynamic overview, a dynamic close-up view, or a preset view. Camera view V has a 3-D position P3 (referred to as a "camera position") defined by a set of controlled parameters, including: a distance D3 from one of the cameras 112 that is set to that view, where the distance D3 is a function of the camera zoom; an elevation angle E3 that is a function of the camera tilt; and an azimuth angle A3 that is a function of the camera pan. Another camera parameter used to set a size or an area of camera view V is a camera Field-of-View (FOV).

Figure 6B:
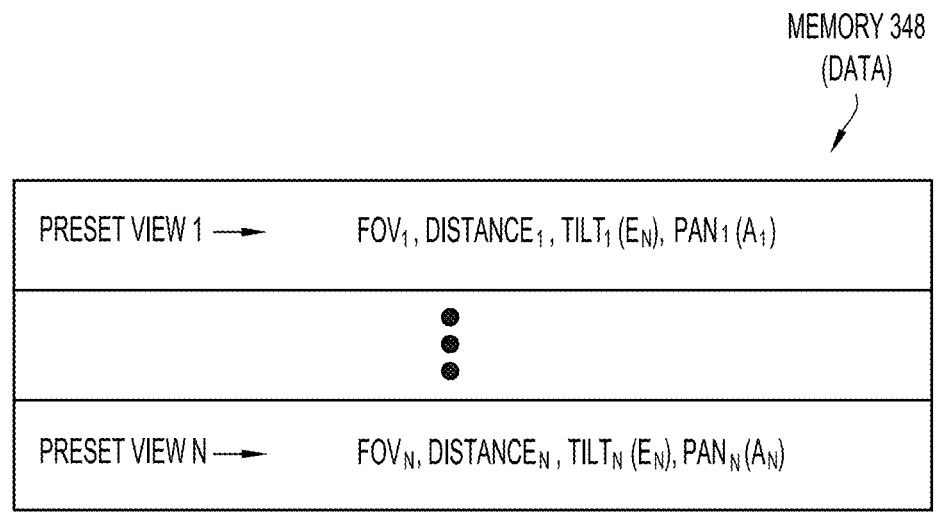
FIG. 6B is an illustration of an example set of camera positions for multiple preset views stored in a memory of the video conference endpoint.

With reference to FIG. 6B, there is an illustration of an example set of camera settings defining camera positions for multiple preset views 1-N stored in memory 348. Each camera position includes a camera FOV (or zoom factor related to a starting FOV), a distance (D), a camera tilt corresponding to an elevation angle (E), and a camera pan corresponding to an azimuth angle (A).

Figure 6C:
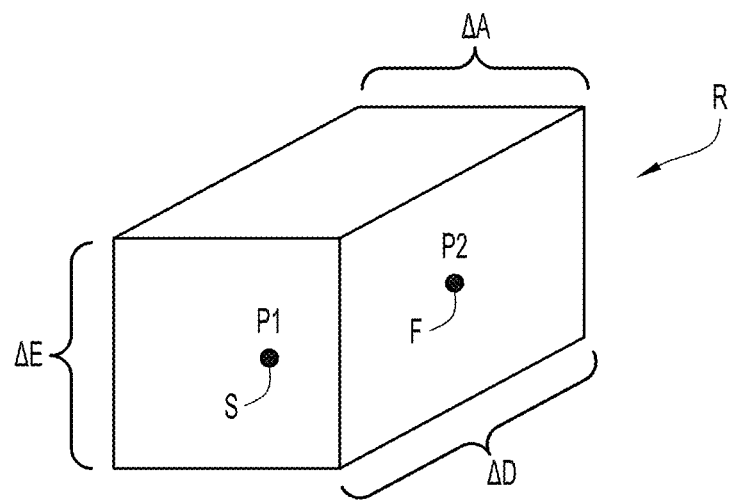
FIG. 6C is an illustration of an example construct used to determine whether the audio source from FIG. 4 and the face from FIG. 5 coincide positionally with each other, according to an example embodiment.

With reference to FIG. 6C, there is an illustration of an example construct used to determine whether audio source S (FIG. 4) and face F (FIG. 5) coincide positionally with each other, i.e., whether their respective positions match each other within a predetermined tolerance. Audio source S at position P1 and face F at position P2 are determined to coincide positionally with each other if it is determined that position P2 is within a predetermined 3-D positional range R centered on position P1. In the example of FIG. 6C, positional range R is depicted as a box centered on P1 and defining an elevation angle range $\Delta E$, an azimuth angle range $\Delta A$, and a distance range $\Delta D$. In an example, the maximum angular distance between a face detection and a detected speaker position is between 2 and 3.5 times the width of the face detection, depending on the estimated speaker distance. The distance estimate of the speaker position preferably differs by less than 50% from the estimated face distance. If these requirements are met the face detection and the audio position are positively matched.

In a similar way, a determination may be made as to whether audio source S is within a preset view, such as any of preset views 1-N (FIG. 6B). That is, audio source S is determined to be in one of the preset views if position P1 is within a volume defined by the parameters associated with the view, i.e., camera Field of View (FOV), distance (D), camera tilt (E), and camera pan A.

Controller 308 is configured to translate position parameters, e.g., camera FOV, D3, E3, and A3, of a 3-D position to corresponding camera control settings (e.g., zoom, tilt, and pan settings) to establish a camera view that coincides with the 3-D position. This enables controller 308 to detect active talkers and/or participant faces, e.g., at positions P1 and/or P2, and then direct cameras 112 to capture video from those positions. In other words, controller 308 may control one or more of cameras 112 to capture video in a view of the detected active talker and/or face.

Figure 7:
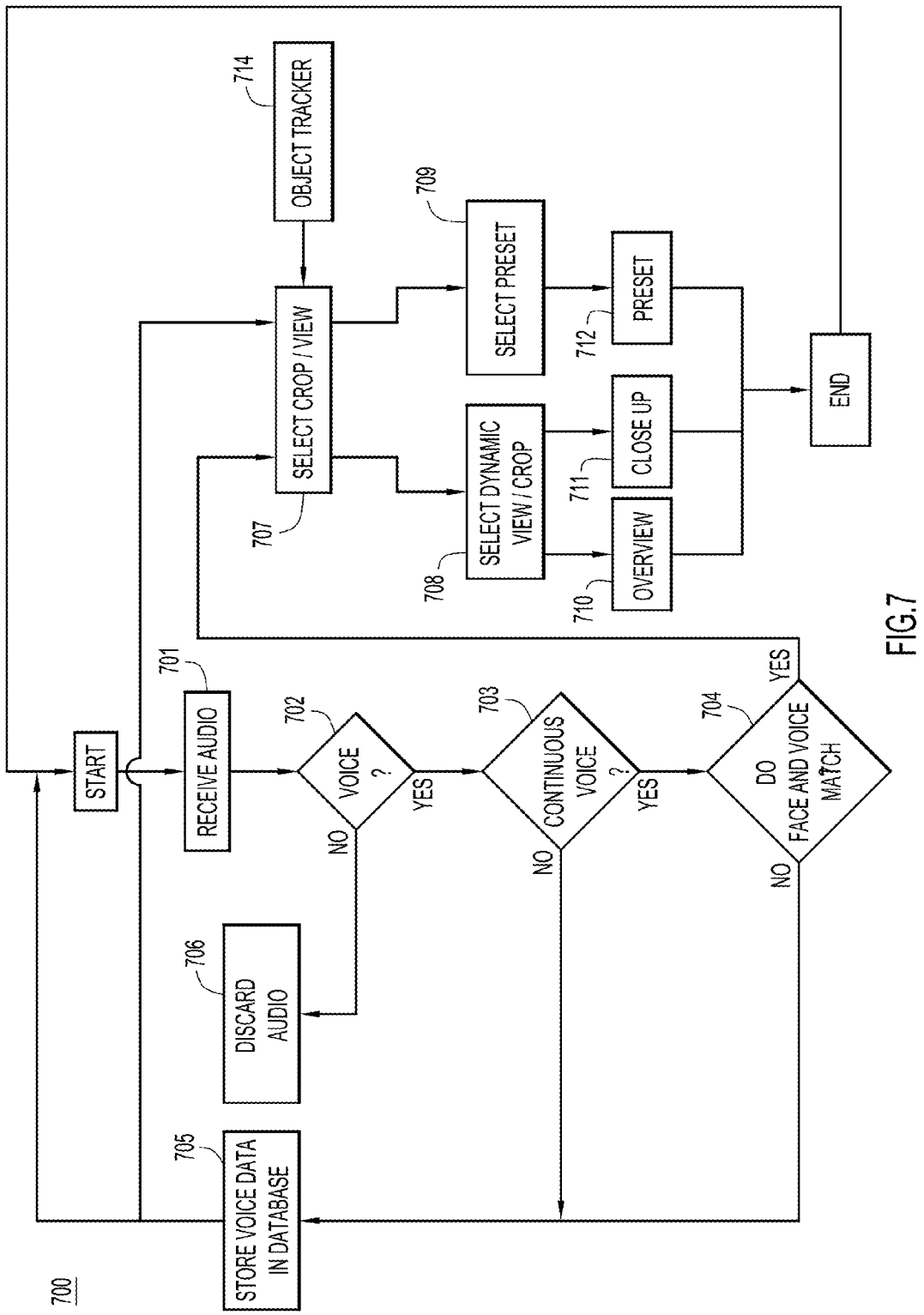
FIG. 7 is a flowchart of an example method of performing automated switching between dynamic and preset camera views during a video conference based on face and voice detection, according to an example embodiment.

With reference to FIG. 7, there is depicted a flowchart of an example method 700 of performing automated switching between dynamic and preset camera views during a video conference based on face and voice detection. Controller 308 may implement method 700 using logic and detectors 350-356 and object tracker 358.

Initially, one of cameras 112 is active meaning that the camera captures video of a view/scene, endpoint 104 processes (e.g., encodes) the video captured by that camera, and transmits the processed video to communication network 110. The other one of cameras 112 is inactive meaning that, while endpoint 104 may still capture and process video from the inactive camera, the endpoint does not transmit the processed video from that camera to communication network 110. In other words, the terms "active" and "inactive" refer to whether captured (processed) video is transmitted, or not transmitted, to communication network 110, respectively. In an example, camera 112A is initially the active camera while camera 112B is the inactive camera.

Also, one or more camera positions corresponding to preset views from which to capture video are stored in memory 348.

At 701, controller 308 detects audio from an audio source and an associated position thereof based on sensed audio from MA 118.

At 702, controller 308 determines whether the detected audio is likely to be a human speaker (i.e., voice/speech). To do this, controller 308 performs both frequency and time domain analysis of the detected audio and determines whether the detected audio is voice/speech based on results of the analysis. Any known or hereafter developed technique may be used to determine whether the detected audio is voice/speech. If the detected audio is determined to be voice/speech, flow proceeds to 703.

At 703, controller 308 determines whether the voice/speech has been active for a predetermined period of time indicating an active talker based on a comparison of the voice/speech against most recently sensed audio samples extending over the predetermined period of time. If the voice/speech is indicated as an active talker (i.e., an active talker is detected), flow proceeds to 704.

At 704, controller 308 detects a face in the captured video and determines whether the detected face coincides positionally and temporally with the active talker. To do this, controller 308 compares the position of the active talker with that of a most recently detected face, and determines whether the position of the active talker and the position of the recently detected face are the same within a predetermined positional range (for example, as described above in connection with FIG. 6C). If there is a match, flow proceeds to 707. An example of face detection is described below in connection with FIG. 8.

Returning to 703, if the voice/speech is determined not to correspond to an active talker because the predetermined time period is not met, i.e., the voice/speech is part of an audio segment that is shorter in duration than the predetermined period of time (an active talker is not detected), flow proceeds to 705. At 705, controller 308 stores the voice/speech in a buffer or database for subsequent validation as voice/speech from an active talker, and flow proceeds to 707 (described later).

Returning to 702, if the detected audio is determined not to be voice/speech, flow proceeds to 706. At 706, the detected audio determined not to be voice/speech is discarded as noise, and flow returns to 701.

Returning to 704, if the detected face and active talker do not coincide positionally and temporally, flow proceeds to 705.

At 714, controller 308 optionally tracks objects in the captured video in parallel with other operations performed by the controller in method 700. More specifically, controller 308 recognizes and tracks movements of participants in the captured video during the conference. Controller 308 provides information regarding any tracked objects (i.e., tracked object information) to 707.

In next operations 707-709, controller 308 selects between the different dynamic and preset views to capture video of a view best suited for the video conference. Controller 308 selects between the different views using view selection logic that is based on the detected speech/voice and the detected faces. An example of such view selection logic is described below in connection with FIG. 1000.

At 707, controller 308 selects between a dynamic camera view or "crop" and a preset view based on any detected faces and active talkers, and optionally also based on the tracked object information. Controller 308 selects the view that is best suited to the conference setting. If the dynamic view is selected at 707, flow proceeds to 708.

At 708, controller 308 selects between the dynamic overview and the dynamic close-up view based on the detected faces and active talkers. If the dynamic overview is selected, flow proceeds to 710. If the dynamic close-up view is selected, flow proceeds to 711.

At 710, controller 308 determines a dynamic overview, i.e., frames a best-fit overview, that encompasses all of the detected faces and then controls cameras 112 to capture video of that overview. The best-fit overview is a view centered on the group of participants 106 and 106' and in which the degree of camera zoom establishes an outer boundary around the group. The outer boundary is fitted relatively tightly to the group but allows room to show, e.g., the face and an upper body of each of the participants with extra margin to accommodate participant movement. Controller 308 may adjust the outer boundary dynamically to account for such movement based on the object tracker information, and when new faces are detected or when previously detected faces become undetectable.

At 711, controller 308 controls one of cameras 112 to capture video of a dynamic close-up view focused on an active talker. The close-up view has an outer boundary fitted relatively tightly to the active talker but allows room to show, e.g., the face and an upper body of the active talker with extra margin to accommodate participant movement. Controller 308 may adjust a center position and the outer boundary dynamically to account for such movement based on the object tracker information.

In operations 707-709, controller 308 selects between the dynamic and preset views based on detected audio and video. An example of such selection logic is described below in connection with FIG. 1000.

Returning to 707/709, if the preset view is selected, flow proceeds to 712.

At 712, controller 308 controls one of cameras 112 to capture video of one of the preset views focused on an active talker. The position and extent (area) of the preset view is based primarily on the initial user defined camera (preset) position, but may be adjusted slightly under dynamic control of controller 308.

In each of operations 710-712, controller 308 (i) moves the previously inactive one of the cameras to the appropriate camera position corresponding to the appropriate view, i.e., commands that camera to appropriate pan, tilt, FOV, and distance settings to set the appropriate view, (ii) deactivates the previously active one of cameras 112 (i.e., the previously active camera becomes inactive) so that video captured by that camera is not longer transmitted to communication network 110, and (iii) activates the previously inactive camera (i.e., the previously inactive camera becomes active) so that video captured by that camera is transmitted to communication network 110. In the example in which camera 112A is the previously active camera and camera 112B is the previously inactive camera, in each of operations 710-712, controller 308 deactivates camera 112A and activates camera 112B. An advantage of using a pair of inactive/active cameras as described above is that video is not captured while a camera is controlled to move to the new camera position/view. In another embodiment, a single camera including digital PTZ features may be used instead of two cameras because the camera digital PTZ features enable the camera to be switched from one view to another between video frames.

Flow control returns to 701 and method 700 repeats. As method 700 repeats, controller 308 causes switches between (i) capturing video of one of the preset views, and (ii) capturing video of a dynamic view and dynamically adjusting the dynamic view to track changing detected face and audio source (active talker) positions.

Figure 8:
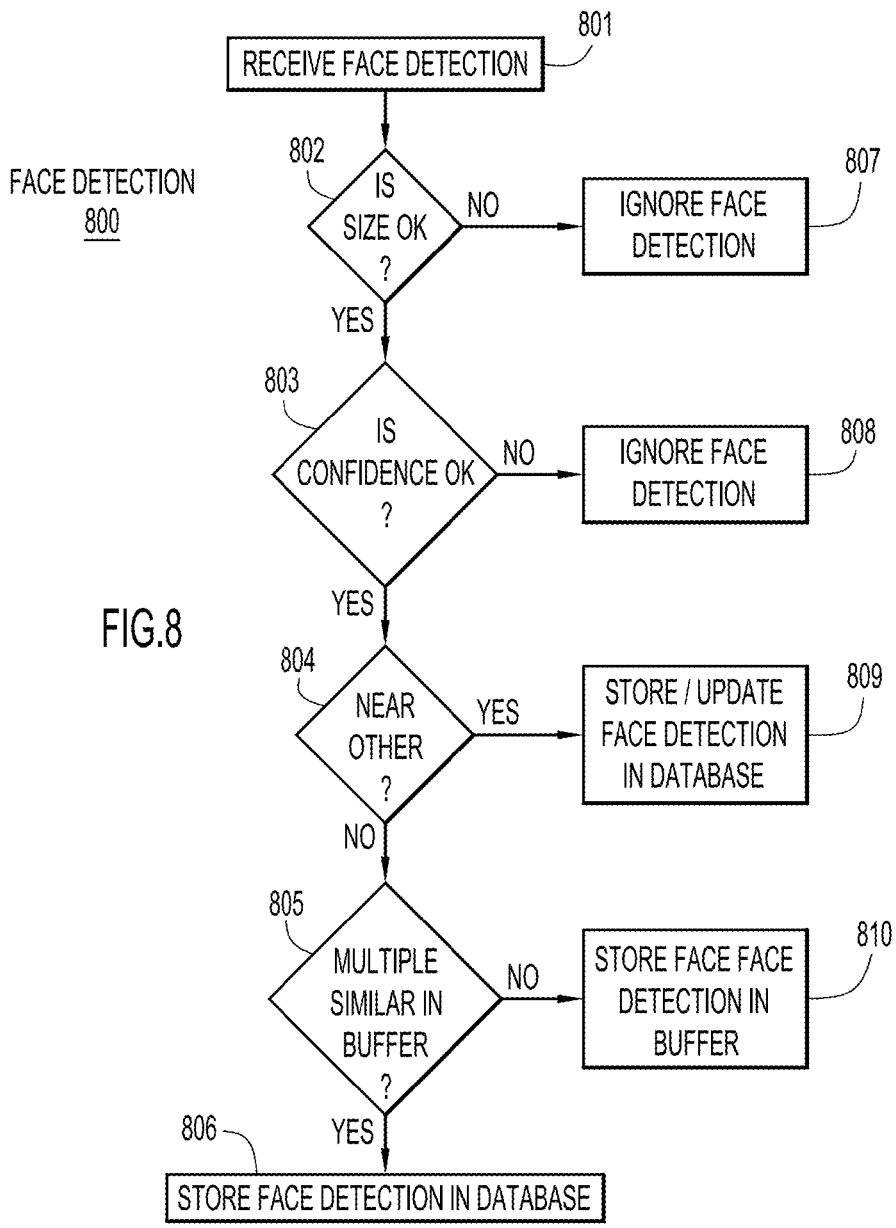
FIG. 8 is a flowchart of an example method of detecting (participant) faces in images of captured video, according to an example embodiment.

With reference to FIG. 8, there is a flowchart of an example method 800 of detecting (participant) faces in images of captured video.

At 801, controller 308 detects a new (candidate) face in the captured video. Controller 308 may use any now known or hereafter developed technique to detect faces. Typically, such techniques detect facial features, such as eyes, nose, mouth, hair, etc. Controller 308 validates the new face as a detected face as described below.

At 802, controller 308 verifies a size of the new face, i.e., that the size is within an allowed size range indicative of a valid face. If the face size is valid, flow proceeds to 803.

At 803, controller 308 verifies a detected face confidence level for the new face, i.e., that the confidence level is above a valid confidence threshold. If the confidence level is above the threshold, flow proceeds to 804.

At 804, controller 308 determines whether the new face is an outlier (e.g., a face of a participant who has just entered room 204) compared to the content of a face database that stores information identifying verified/confirmed detected faces. If the new face is determined to be similar to a previously stored detected face in the face database, the new face is not regarded as an outlier, and is interpreted instead as a previously detected face that has moved slightly. On the other hand, if the new face is determined to be too dissimilar from the detected faces stored in the face database, the new face is regarded as a possible new participant that needs to be confirmed/validated using subsequently detected "new" faces having approximately the same position. If confirmed as a face of a new participant, flow proceeds from 804 to 809 where controller 308 stores the new face in the face database as a detected face, or a sufficiently similar detected face in the face database is updated to reflect the new face. If not confirmed as the face of a new participant, flow proceeds from 804 to 805.

At 805, controller 308 determines whether a face detection buffer, in which outlier faces are stored temporarily awaiting confirmation as actual new participants, contains several previously stored outlier faces similar to the new face. If it is determined that the face detection buffer contains several similar outlier faces, flow proceeds to 806, where controller 308 stores the new face in the face database. Otherwise, flow proceeds to 810, where the controller stores the new face in face detection buffer.

Returning to 802 and 803, if the face size is not valid or the confidence level is below the confidence threshold, flow proceeds to 807 or 808, respectively, where controller 308 discards the new face.

Figure 9:
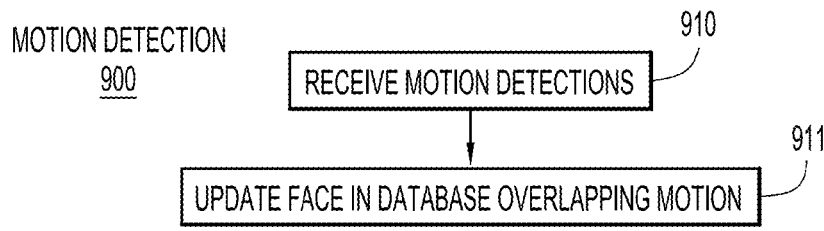
FIG. 9 is a flowchart of an example method of detecting motion in captured video, according to an example embodiment.

With reference to FIG. 9, there is depicted a flowchart of an example method 900 of detecting motion.

At 910, controller 308 detects new motion in captured video. Any known or hereafter developed technique to detect motion in video may be used.

At 911, controller 308 updates detected faces in the face database that overlap any of the detected motion. Regions of the captured video (images) in which previously detected faces coincide or overlap currently detected motion are regarded "interesting" and retained. Older detected faces that do not overlap with detected motion are discarded from the face database over time, e.g., through a video conference session.

Figure 10:
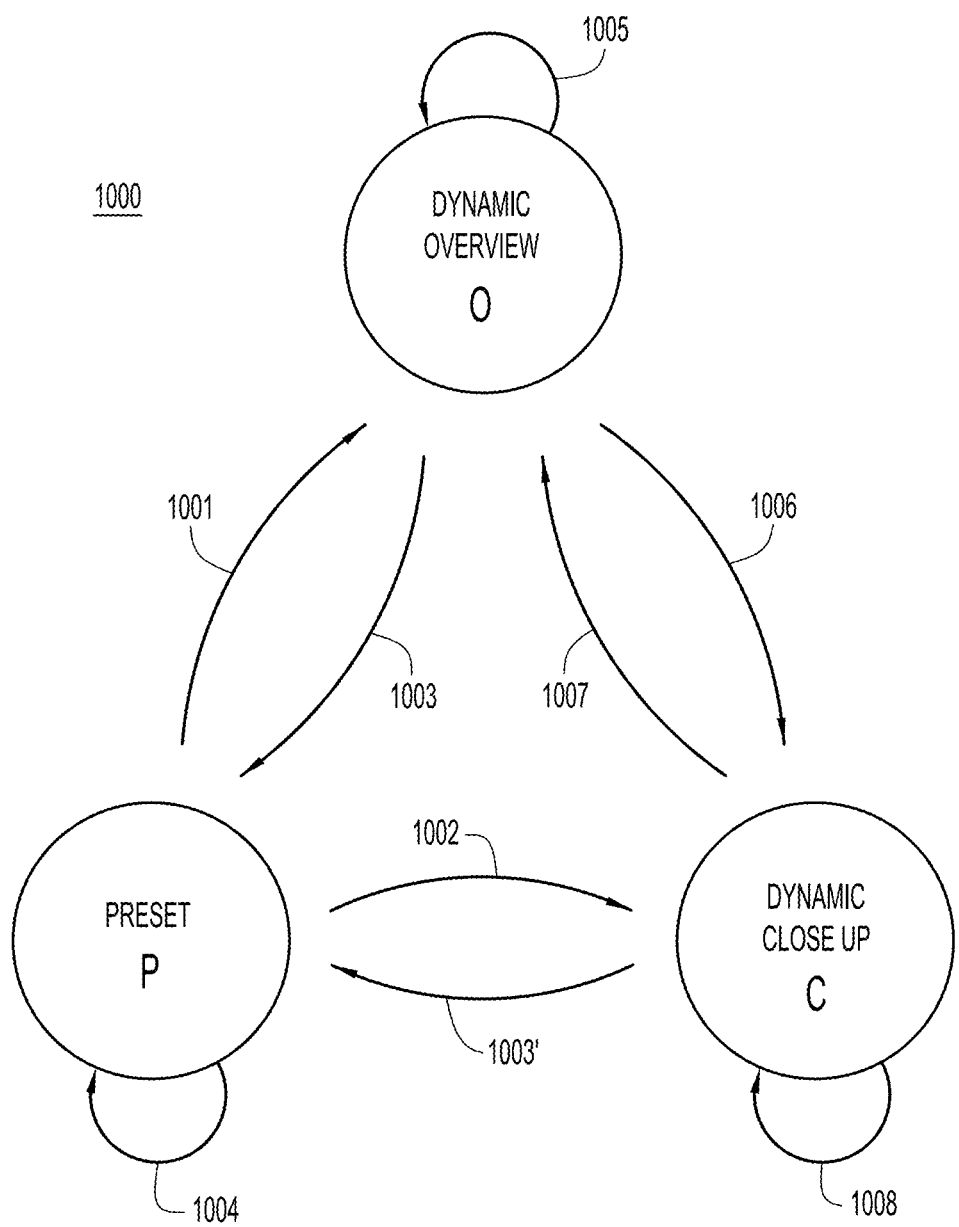
FIG. 10 is an example state transition diagram that shows transitions between dynamic and preset camera views, according to an example embodiment.

With reference to FIG. 10, there is depicted an example state transition diagram 1000 that shows transitions between dynamic and preset camera views. State transition diagram 1000 includes transitions or switches 1001-1008 between a dynamic overview state O in which controller 308 controls cameras 112 to capture video of a dynamic overview, a dynamic close-up view state C in which the controller controls the cameras to capture video of a dynamic close-up view, and a preset state P in which the controller controls the cameras to capture video in one of multiple possible preset views. Logic to cause transitions 1001-1008 is described below, wherein the dynamic overview state O, the dynamic close-up view state C, and the preset view state P are indicated as (O), (C), and (P), respectively.

Transition 1001: while capturing video of an active talker in one of the preset views (P), if a new active talker is detected outside of a previous dynamic overview from which video was previously captured, or if the active talker has moved sufficiently far away from the preset view (i.e., a predetermined distance away from the preset view) but is no longer talking (i.e., the participant corresponding to the active talker has moved but stopped talking) and is outside of all of the preset views, transition to capturing video of a new dynamic overview (O) that encompasses all of the detected faces including the face of the new active talker.

Transition 1002: while capturing video of an active talker in one of the preset views (P), if the active talker is no longer detected in that preset view and if a new active talker is detected outside of all of the preset views and inside a previous dynamic overview, transition to capturing video of a close-up view (C) of the new active talker.

Transitions 1003 and 1003': while capturing video of either a dynamic overview (O) or a close-up view (C), if an active talker is detected in one of the preset views, transition to capturing video of that preset view (P). An active talker is detected in one of the preset views if it is determined that the position of the active talker is within the preset view, as described above.

Transition 1004: while capturing video of one of the preset views (P), if the active talker is no longer detected in that preset view and if an active talker is detected in one of the other preset views, or if the active talker has moved to a new preset view but is no longer talking (i.e., the participant corresponding to the active talker has moved but stopped talking), transition to capturing video of the other one of the preset views (P).

Transition 1005: while capturing video of the dynamic overview (O), if a detected face is no longer detected (i.e., it becomes undetectable) or if a new face is detected, transition to/remain in the dynamic overview (O) and adjust the dynamic overview to account for the no longer detected face or the new detected face.

Transition 1006: while capturing video of the dynamic overview (O), if an active talker is detected in the dynamic overview and outside of all of the defined preset views, transition to capturing video of a dynamic close-up view (C) of the active talker.

Transition 1007: while capturing video of a close-up view of an active talker (C), if the active talker is no longer detected, transition to capturing video of the dynamic overview (O).

Transition 1008: while capturing video of a close-up view of an active talker (C), if the active talker is no longer detected in the close-up view and a new active talker is detected, transition to capturing video of a new dynamic close-up view of the new active talker (C).

Techniques presented herein use a combination of a camera position known to frame an object of interest, a known distance to the object, and a detected position of an active talker in relation to the object, to determine when a camera should automatically move to frame that object of interest. A system to do this includes a microphone array, processing units/controller (e.g. a coder-decoder or codec) and one or more cameras. The microphone array is used to detect the placement of sound sources in the room, e.g. the current talker. The processing units may store information about camera positions known to frame objects on interest in the room or the actual placement of the objects. The camera is used to frame the objects of interest and can also provide additional detections, e.g. face detections.

In one embodiment, the camera position known to frame a specific object, e.g. a whiteboard, is stored. This can be done using a user interface for controlling the position of the camera while viewing in self view. In addition, the distance to the object is stored. When a speaker is standing close to the object and starts talking, the microphone array picks up the sound and the processing unit determines that the position (including distance) match that of the object (given by the combination of a stored camera position and the distance). The system can then automatically move the camera to the stored camera position.

In a second embodiment, the system includes a speaker tracking system, such as Speaker Track 60.

In another embodiment, both camera position and distance are manually input to the system.

In yet another embodiment, the system automatically derives the distance to the object of interest based on distance sensing technologies, e.g. stereoscopy, a time-of-flight (TOF) sensor, and the like.

In yet another embodiment, the system may detect objects of interest automatically, e.g. by using image analysis to recognize objects such as a whiteboards, as well as detecting distance as described above. Successively, the system may show these objects when speakers stand close to them.

The automatic switching gives far-end conference participants a better view of objects relevant to the meeting and relieves local participants of the burden of making camera adjustments during the conference.

In summary, in one form, a method is provided comprising: at a video conference endpoint including one or more cameras controllable to capture video of different views and a microphone array to sense audio: defining one or more preset views from which to capture video; detecting faces and associated positions thereof in the captured video; detecting active audio sources and associated positions thereof from the sensed audio; detecting any active talkers each as a detected face that coincides positionally with a detected active audio source; detecting whether an active talker is in any of the preset views; and based on results of whether an active talker is detected in any of the preset views, automatically switching between (i) capturing video of one of the preset views, and (ii) capturing video of a dynamic view and dynamically adjusting the dynamic view to track changing detected face positions.

In summary, in another form, an apparatus is provided comprising: one or more cameras controllable to capture video of different views; a microphone array to sense audio; and a processor, coupled to the one or more cameras and the microphone array, to: detect faces and associated positions thereof in the captured video; detect audio sources and associated positions thereof from the sensed audio; detect any active talkers each as a detected face that coincides positionally with a detected active audio source; detect whether an active talker is in any of the preset views; and based on results of whether an active talker is detected in any of the preset views, control the one or more cameras to switch automatically between (i) capturing video of one of the preset views, and (ii) capturing video of a dynamic view and dynamically adjusting the dynamic view to track changing detected face positions.

In summary, in yet another form, a processor readable medium is provided to store instructions that, when executed by a processor, cause the processor to: receive video of different views captured by one or more controllable cameras; receive audio sensed by a microphone array; detect audio sources and associated positions thereof from the sensed audio; detect faces and associated positions thereof in the captured video; detect any active talkers each as a detected face that coincides positionally with a detected active audio source; detect whether an active talker is in any of the preset views; and based on results of whether an active talker is detected in any of the preset views, control the one or more cameras to switch automatically between (i) capturing video of one of the preset views, and (ii) capturing video of a dynamic view and dynamically adjusting the dynamic view to track changing detected face positions.

The above description is intended by way of example only. Various modifications and structural changes may be made therein without departing from the scope of the concepts described herein and within the scope and range of equivalents of the claims.

What is claimed is:

1. A method comprising:
at a video conference endpoint including a camera controllable to capture video and a microphone array to sense audio:
defining with user input one or more preset views from which to capture video;
processing images in captured video with a face detection algorithm to detect faces and associated positions thereof in the images;
detecting active talkers and associated positions thereof from the sensed audio; and
controlling the camera to capture video of different possible views including the preset views and dynamic views, wherein for each dynamic view the controlling includes creating the dynamic view without user input to define the dynamic view, fitting an outer boundary of the dynamic view to one or more of the detected faces, and dynamically adjusting the dynamic view to track changing face positions over time, the controlling further comprising:
while capturing video of one of the dynamic views, if an active talker is detected in one of the preset views, switching to capturing video of that preset view; and
while capturing video of one of the preset views, if a new active talker is detected outside of one of the dynamic views from which video was previously captured, switching to capturing video of a new dynamic view that encompasses all of the detected faces including the face of the new active talker.

2. The method of claim 1, wherein:
the dynamic views include a dynamic overview that encompasses and is fitted to all of the faces detected by the face detection algorithm, and a close-up view that encompasses a smaller area than the dynamic overview; and
the controlling further includes switching between:
capturing video of one of the preset views;
capturing video of the dynamic overview; and
capturing video of the dynamic close-up view.

3. The method of claim 2, the controlling further comprising: while capturing video of either the dynamic overview or close-up view, if an active talker is detected in one of the preset views, the switching between includes switching to capturing video of that preset view.

4. The method of claim 3, the controlling further comprising: while capturing video of one of the preset views, if a new active talker is detected outside of a dynamic overview from which video was previously captured, switching to capturing video of a new dynamic overview that encompasses all of the detected faces including the face of the new active talker.

5. The method of claim 3, the controlling further comprising: while capturing video of one of the preset views, if the active talker is no longer detected in that preset view and if an active talker is detected in one of the other preset views, switching to capturing video of the other one of the preset views.

6. The method of claim 3, the controlling further comprising: while capturing video of one of the preset views, if the active talker is no longer detected in that preset view and if a new active talker is detected outside of all of the preset views but inside a previous dynamic overview, switching to capturing video of a close-up view of the new active talker.

7. The method of claim 3, the controlling further comprising:
while capturing video of the dynamic overview, if an active talker is detected in the dynamic overview and outside of all of the preset views, switching to capturing video of a dynamic close-up view of the active talker; and
while capturing video of a close-up view of an active talker, if the active talker is no longer detected, switching to capturing video of the dynamic overview.

8. An apparatus comprising:
one or more cameras controllable to capture video of different views;
a microphone array to sense audio; and
a processor, coupled to the one or more cameras and the microphone array, to:
define with user input one or more preset views from which to capture video;
process images in captured video with a face detection algorithm to detect faces and associated positions thereof in the images;
detect active talkers and associated positions thereof from the sensed audio; and
control the one or more cameras to capture video of different possible views including the preset views and dynamic views, wherein for each dynamic view the processor is configured to control the one or more cameras so as to create the dynamic view without user input to define the dynamic view, fit an outer boundary of the dynamic view to one or more of the detected faces, and dynamically adjust the dynamic view to track changing face positions over time, wherein the processor is further configured to control the one or more cameras by:
while capturing video of one of the dynamic views, if an active talker is detected in one of the preset views, switching to capturing video of that preset view; and
while capturing video of one of the preset views, if a new active talker is detected outside of one of the dynamic views from which video was previously captured, switching to capturing video of a new dynamic view that encompasses all of the detected faces including the face of the new active talker.

9. The apparatus of claim 8, wherein:
the dynamic views include a dynamic overview that encompasses and is fitted to all of the faces detected by the face detection algorithm, and a close-up view that encompasses a smaller area than the dynamic overview; and
the processor is further configured to control the one or more cameras to switch between:
capturing video of one of the preset views;
capturing video of the dynamic overview; and
capturing video of the dynamic close-up view.

10. The apparatus of claim 9, wherein, while capturing video of either the dynamic overview or close-up view, if an active talker is detected in one of the preset views, the processor is further configured to control the one or more cameras to switch to capturing video of that preset view.

11. The apparatus of claim 10, wherein, while capturing video of one of the preset views, if a new active talker is detected outside of a dynamic overview from which video was previously captured, the processor is further configured to control the one or more cameras to switch to capturing video of a new dynamic overview that encompasses all of the detected faces including the face of the new active talker.

12. The apparatus of claim 10, wherein, while capturing video of one of the preset views, if the active talker is no longer detected in that preset view and if a new active talker is detected outside of all of the preset views but inside a previous dynamic overview, the processor is further configured to control the one or more cameras to switch to capturing video of a close-up view of the new active talker.

13. The apparatus of claim 10, wherein:
while capturing video of the dynamic overview, if an active talker is detected in the dynamic overview and outside of all of the preset view, the processor is further configured to control the one or more cameras to switch to capturing video of a dynamic close-up view of the active talker; and
while capturing video of a close-up view of an active talker, if the active talker is no longer detected, the processor is further configured to control the one or more cameras to switch to capturing video of the dynamic overview.

14. A non-transitory processor readable medium storing instructions that, when executed by a processor, cause the processor to:
receive video of different views captured by one or more cameras controllable to capture video;
receive audio sensed by a microphone array;
define with user input one or more preset views from which to capture video;
process images in captured video with a face detection algorithm to detect faces and associated positions thereof in the images;
detect active talkers and associated positions thereof from the sensed audio; and
control the one or more cameras to capture video of different possible views including the preset views and dynamic views, wherein the instructions include instructions to cause the processor to control the one or more cameras for each dynamic view so as to create the dynamic view without user input to define the dynamic view, fit an outer boundary of the dynamic view to one or more of the detected faces, and dynamically adjust the dynamic view to track changing face positions over time, wherein the instructions include instructions to cause the processor to control the one or more cameras by:
while capturing video of one of the dynamic views, if an active talker is detected in one of the preset views, switching to capturing video of that preset view; and
while capturing video of one of the preset views, if a new active talker is detected outside of one of the dynamic views from which video was previously captured, switching to capturing video of a new dynamic view that encompasses all of the detected faces including the face of the new active talker.

15. The processor readable medium of claim 14, wherein:
the dynamic views include a dynamic overview that encompasses and is fitted to all of the faces detected by the face detection algorithm, and a close-up view that encompasses a smaller area than the dynamic overview; and
the instructions include instructions to cause the processor to control the one or more cameras to switch between:
capturing video of one of the preset views;
capturing video of the dynamic overview; and
capturing video of the dynamic close-up view.

16. The processor readable medium of claim 15, wherein the instructions include instructions to cause the processor to control the one or more cameras to: while capturing video of either the dynamic overview or close-up view, if an active talker is detected in one of the preset views, switch to capturing video of that preset view.

17. The processor readable medium of claim 16, wherein the instructions include instructions to cause the processor to control the one or more cameras to: while capturing video of one of the preset views, if a new active talker is detected outside of a dynamic overview from which video was previously captured, the processor controls the one or more cameras to switch to capturing video of a new dynamic overview that encompasses all of the detected faces including the face of the new active talker.

18. The method of claim 1, wherein the detecting active talkers includes:
detecting active audio sources and associated positions thereof from the sensed audio;
detecting any active talkers each as a detected face that coincides positionally with a detected active audio source.

* * * * *